Oct. 30, 1962　　H. L. HAMEISTER ETAL　　3,061,064

MACHINE TOOL

Filed Feb. 25, 1960　　　　　　　　　　　　9 Sheets-Sheet 1

INVENTORS
HAROLD L. HAMEISTER
FRANK H. SMITH
ROBERT B. WALLACE
BY
John H. Lewis, Jr.
John W. Phipps
ATTORNEYS

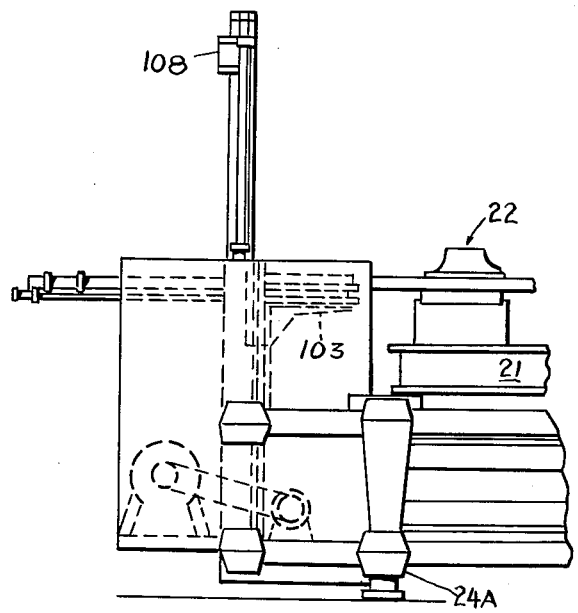
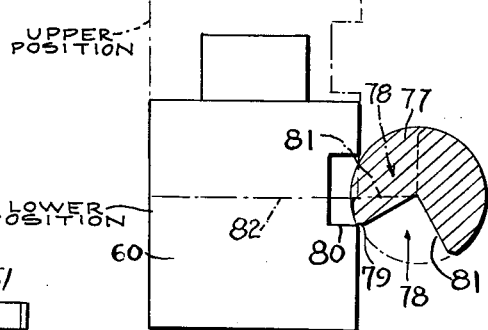
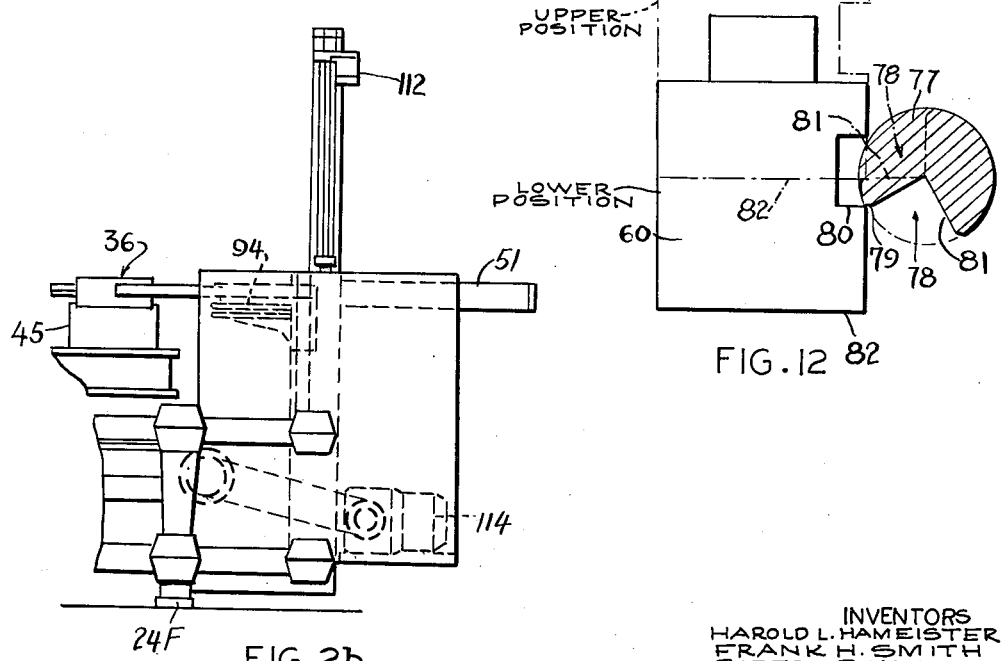

Oct. 30, 1962   H. L. HAMEISTER ETAL   3,061,064
MACHINE TOOL

Filed Feb. 25, 1960   9 Sheets-Sheet 5

INVENTORS
HAROLD L. HAMEISTER
FRANK H. SMITH
ROBERT B. WALLACE
BY John H. Lewis, Jr.
John W. Phipps
ATTORNEYS Oct. 30, 1962   H. L. HAMEISTER ETAL   3,061,064
MACHINE TOOL
Filed Feb. 25, 1960   9 Sheets-Sheet 7
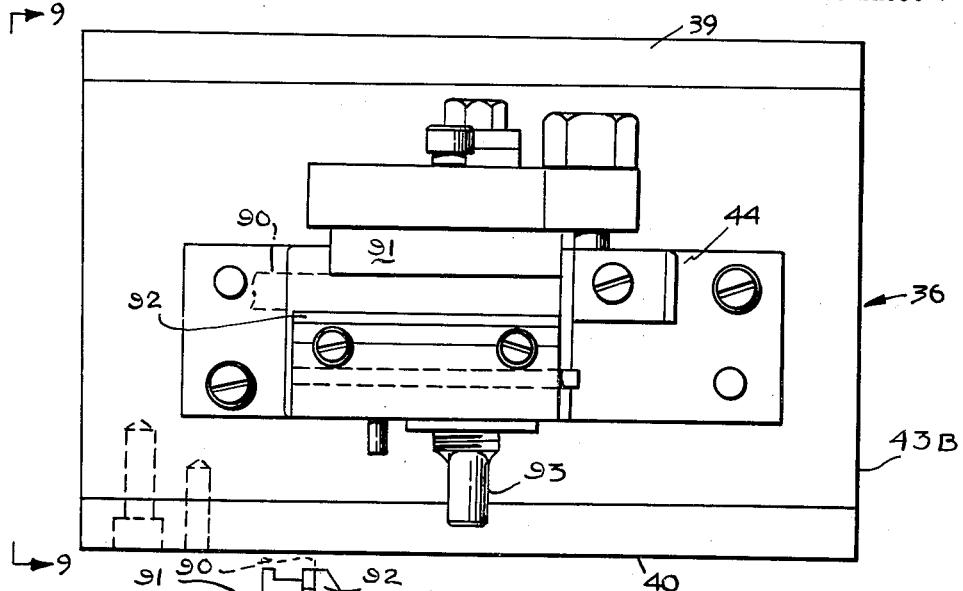
FIG. 8
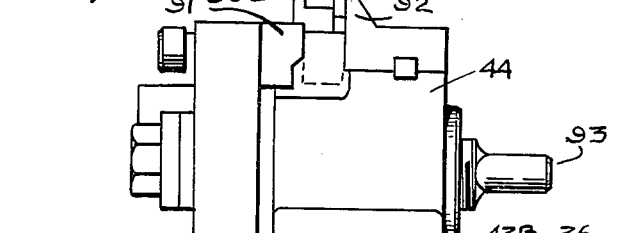
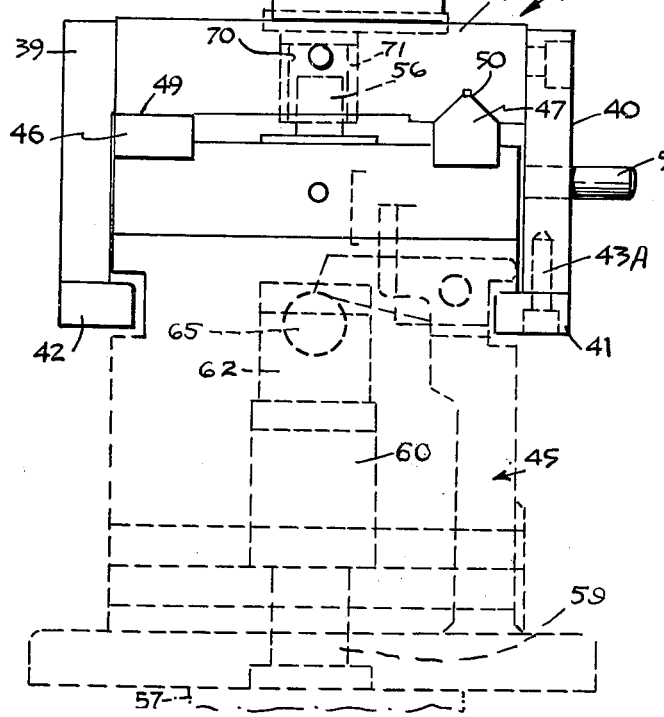
FIG. 9
INVENTORS
HAROLD L. HAMEISTER
FRANK H. SMITH
ROBERT B. WALLACE
BY John W. Louis, Jr.
   John W. Phipps
ATTORNEYS Oct. 30, 1962  H. L. HAMEISTER ETAL  3,061,064
MACHINE TOOL Filed Feb. 25, 1960  9 Sheets-Sheet 8

INVENTORS
HAROLD L. HAMEISTER
FRANK H. SMITH
ROBERT B. WALLACE

BY John H. Lewis, Jr.
John W. Phipps
ATTORNEYS

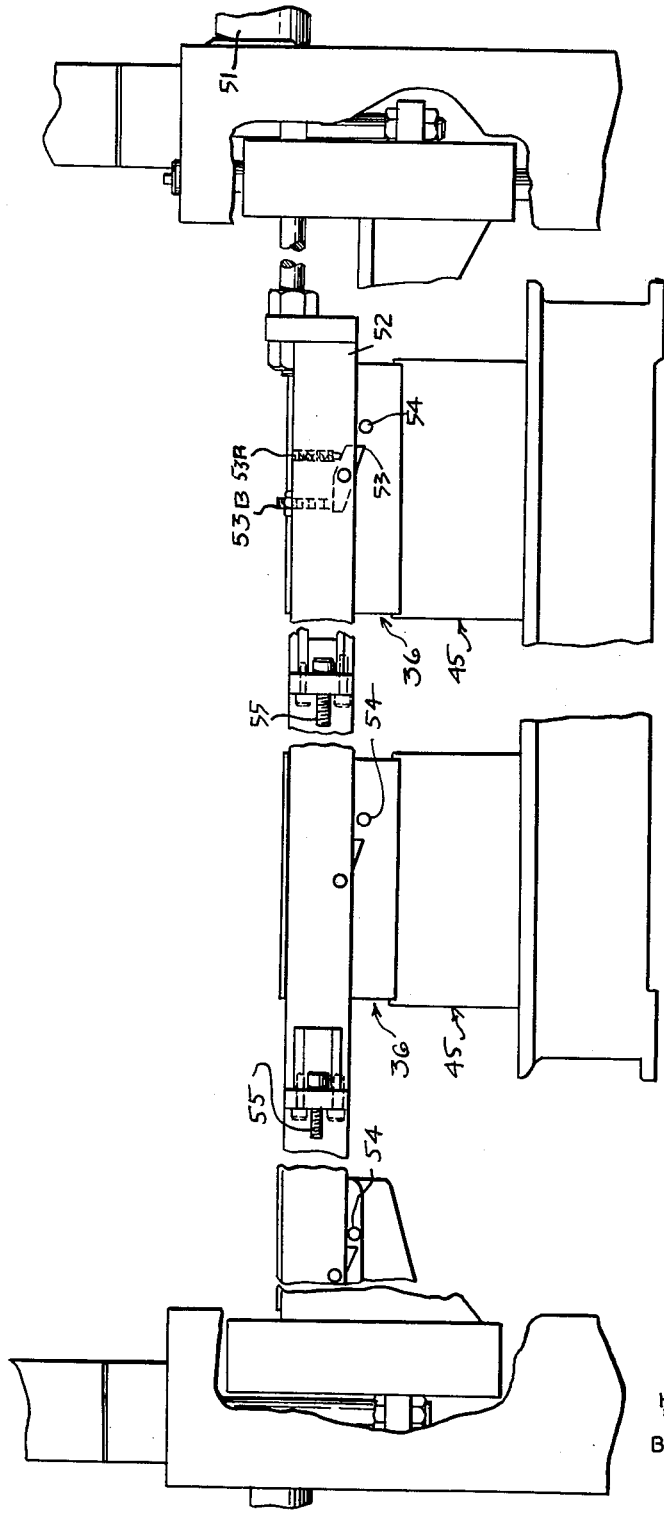

United States Patent Office 3,061,064
Patented Oct. 30, 1962

3,061,064
MACHINE TOOL
Harold A. Hameister and Robert B. Wallace, Ilion, N.Y., and Frank H. Smith, Richmond, Va., assignors to Remington Arms Company, Inc., Bridgeport, Conn., a corporation of Delaware
Filed Feb. 25, 1960, Ser. No. 10,984
16 Claims. (Cl. 198—19)

This invention relates to machine tools and particularly to a multiple station arrangement having a plurality of units which may be selectively assembled in various lengths or configurations.

In the prior art, it generally has been necessary to build a base for the length of machine desired and this has made it difficult to allow for change in the number of machine tools or work stations for various operations. In the production of gun parts, especially for small arms, tolerances must be very close so as to permit interchangeability. An example of such a part is the trigger plate, the bolt, etc. Many of the prior devices have not been sufficiently rigid to be able to perform accurately heavy milling cuts, drilling operations, or the like, particularly when the work piece is transferred from station-to-station. Further, many of the prior multi-station machines are relatively large, expensive and must be individually designed and built.

One of the objects of the invention is to provide a machine which will perform accurately various machining operations on work and which is adaptable for various uses.

Another of the objects of the invention is to provide a machine tool which can be made in any desired length so as to accommodate any desired number of machine tool operations.

A still further object of the invention is to provide a multiple machine tool arrangement which can operate with accuracy on relatively small parts after the parts are transferred from station-to-station.

In one aspect of the invention, there are a plurality of units which can be assembled into a straight-line or similar type machine. Each unit may include a relatively heavy rigid table member upon which one or more machine tools or work stations can be mounted, the table itself being supported on leg means arranged so that two mating or adjoining table margins, except the end unit margins, are supported on each leg. In order to hold the legs and tables of the units in assembled relation, longitudinally extending tie rod members can be provided, there preferably being at least two sets or groups, said sets being located along spaced longitudinal axes. Each set or group of tie rods is not continuous along its axis, the adjacent ends of the tie rods abutting at a leg and being clamped thereto. The abutting ends of the group of tie rods along one axis abut or are held in a different leg than those along the other axis. Thus, the tie rod ends are in staggered or straddled relationship. Preferably there are upper and lower sets extending along each side. The machine can be assembled in various lengths so as to provide a relatively rigid assembly. The work is mounted on a work carrier means which can be transferred from station-to-station. Suitable fixtures for holding the work can be fastened to each carrier means. Each of the units may have one or more pedestals or work stations with conveyor tracks or guide surfaces thereon for each machine tool station, the conveyor tracks having spaced ends, so that as the work is transferred on a work carrier means from station-to-station, by a transfer bar means, the track means do not have to be accurately aligned relative to each other. The longitudinal spacing between track means is less than the length of the work carrier means, so that the carrier means will straddle the space therebetween. The work carriers are positively located by a locating pin or similar means after being moved by the transfer mechanism, and then are clamped at each station. A single operating means can be used for operating both the locating pin and the clamping means. The locating and clamping means at each work station may have a mechanical feeler or sensing arrangement associated therewith and with the tool actuating means to prevent operation of the machine tools until the work or part is located and clamped. The same mechanical sensing means also can be arranged so that the transfer bar means cannot be operated until the locating and clamping means are moved to inactive position and out of contact with the carrier means.

In the arrangement of the means for holding the units in aligned relation, the rigid tables and the longitudinally extending tie rods preferably are located above the floor and are substantially parallel thereto. The tables and tie rods also are located in spaced planes which in conjunction with the relatively heavy legs tends to provide a very rigid structure such as is necessary for accurate machining in this type of a machine. Further, it is possible to disassemble the units, put other units therein, to shorten the machine or to add units thereto. Each work station may have a plurality of tools such as drills, etc.

These, other objects, advantages and features of the invention will become apparent from the following description and drawings which are merely exemplary.

In the drawings:

FIG. 2a is a fragmentary enlarged side elevation, taken at the left end of FIG. 2;

FIG. 2b is similar to FIG. 2a but is taken at the right end of FIG. 2;

FIG. 8 is a top view of a carrier with a fixture thereon;

FIG. 9 is a view looking in the direction 9—9 of FIG. 8;

FIG. 11 is a fragmentary side view of the transfer bar means; and

FIG. 12 is a fragmentary side view along the line 12—12 of FIG. 7.

Figure 4:
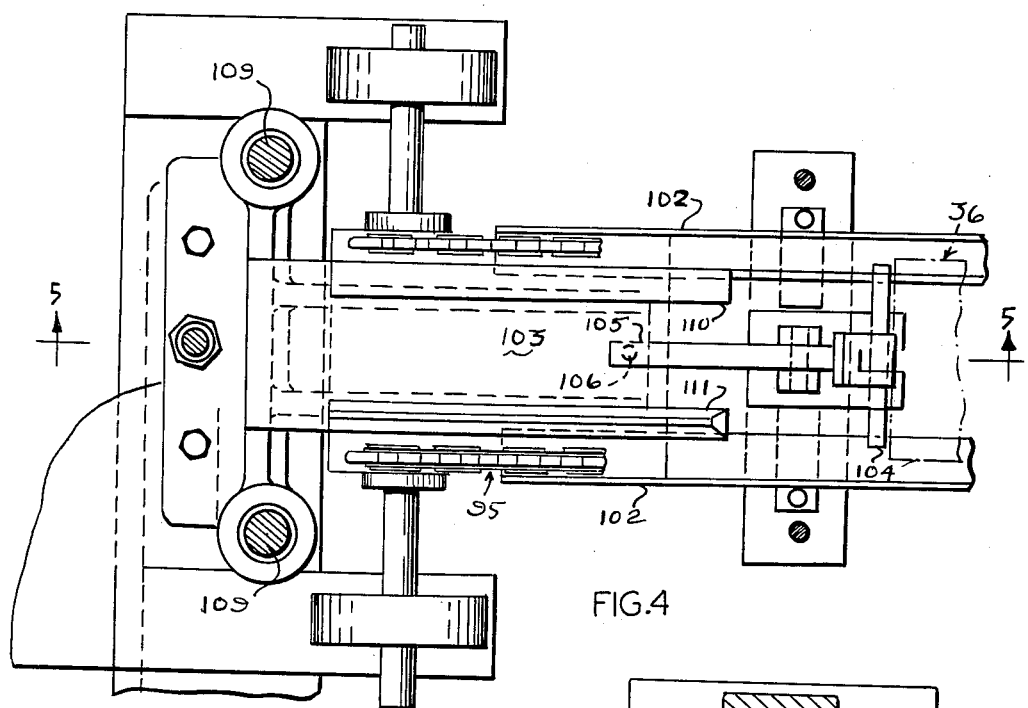
FIG. 4 is a fragmentary enlarged plan view of the bottom or return conveyor means, taken in the direction of line 4—4 of FIG. 2.

In general, the machine will be described in conjunction with the machining of a trigger plate for a gun, such as a shotgun, it being understood, however, that other parts and articles can be machined. Trigger plates, such as shown schematically at 90 (FIGS. 8, 9), are mounted in fixtures 44, the fixtures being designed according to the particular part to be machined. The fixtures are mounted on carrier means 36, the carrier means being introduced at the left of the machine (FIG. 2) from an elevator 103 and transferred from station-to-station. The finished part can be replaced with a new part at the first station. In the fixture shown, jaws 91, 92 (FIGS. 8, 9) are moved relative to each other by screw means 93 in a conventional manner. When a carrier reaches the right end of the machine (FIG. 2), the carrier is transferred to elevator 94 (FIGS. 2, 2b) which lowers it to a return path which may be return conveyor chain 95 (FIGS. 4, 5), such transporting the carrier 36 again to the left end of the machine. At this point it is elevated in readiness to be transferred to the work path and the first station. It should be apparent that the operator may load and unload pieces at any station in the machine and that there may be a plurality of lines within a machine.

Figure 1:
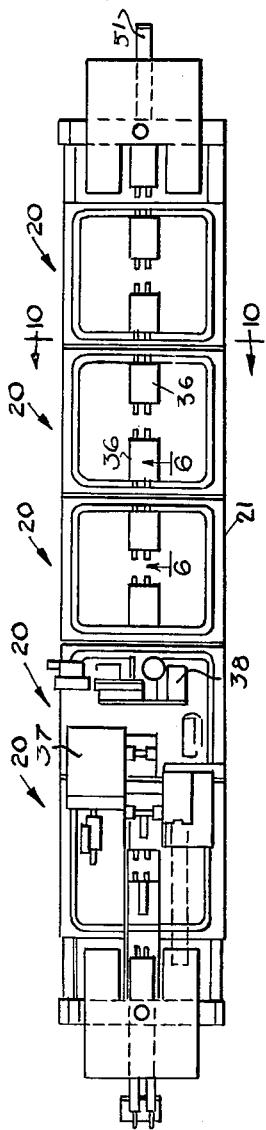
FIG. 1 is a plan view of one form of the machine, some of the parts being shown schematically.
Figure 2:
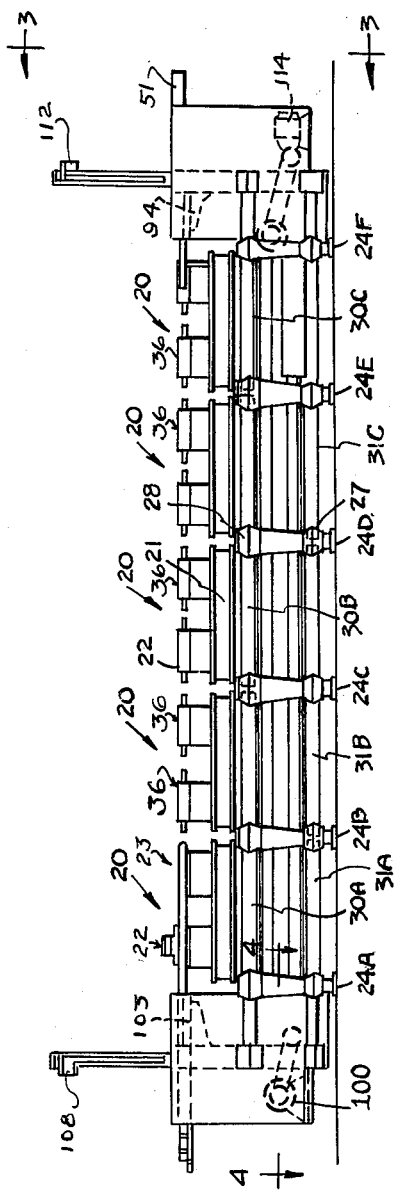
FIG. 2 is a side elevation of the machine.
Figure 10:
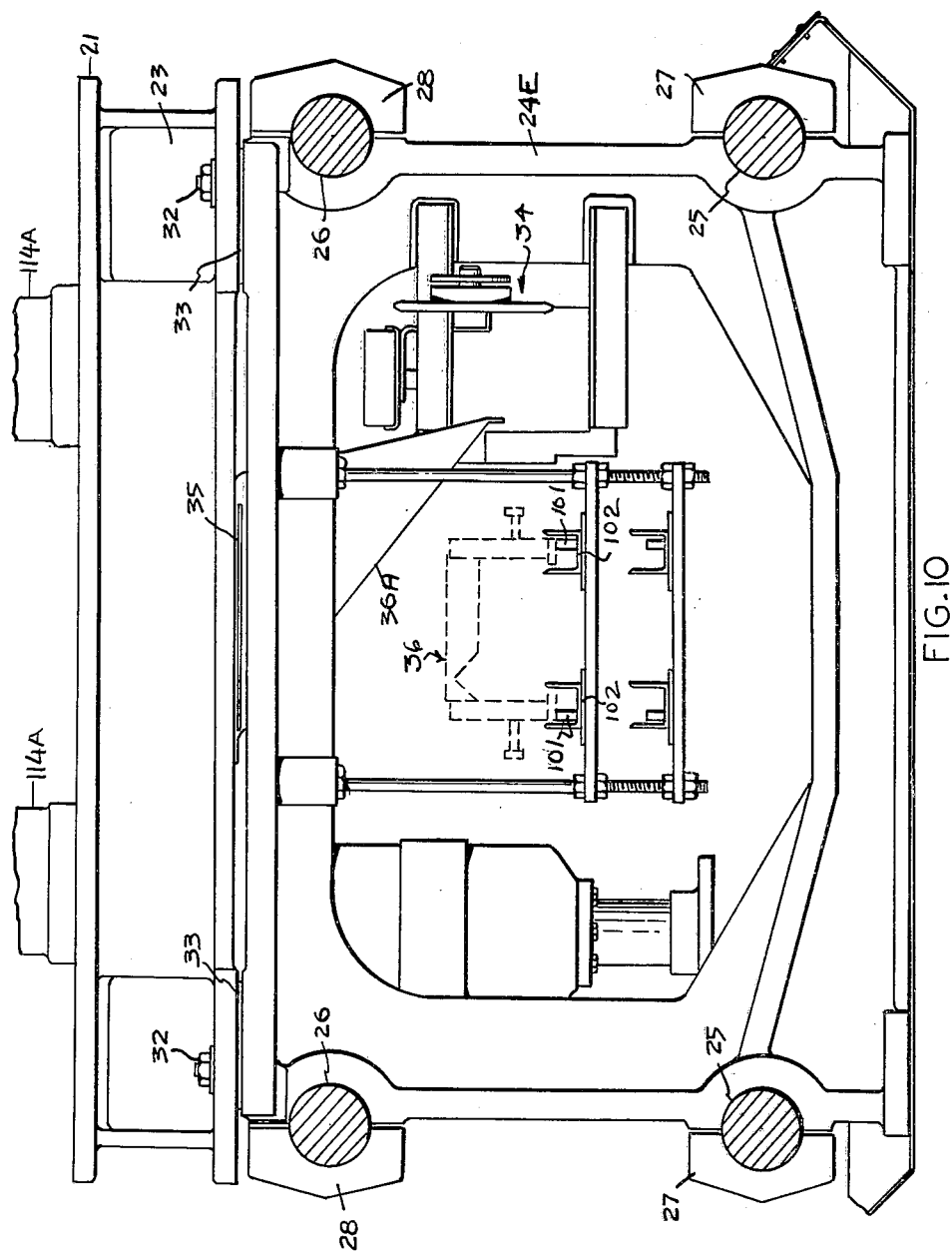
FIG. 10 is a view looking in the direction 10—10 of FIG. 1.

Referring now to FIGS. 1 and 2, individual units 20 may each have a table 21, said table being relatively heavy. Each table, in the interest of economy, may have two work stations, such being schematically indicated at 22 and 23. The relatively heavy tables 21 are supported on legs 24A, 24B, 24C, 24D, 24E, 24F, said legs being box-like frames (FIG. 10) extending the width of the machine. The legs are of rigid construction and also provide support for the return conveyor. The tables 21 are arranged so that intermediate legs 24B, 24C, 24D and 24E will support the edges or margins of adjoining tables.

Table 21 (FIGS. 2, 10) has saddle means 25, 26 thereon and tie rod clamping caps 27, 28. The upper group or set of tie rods comprises rods 30A, 30B and 30C, such being held by caps 28. The lower tie rod group or set comprises tie rods 31A, 31B and 31C, such being held by caps 27. The axes of the groups or sets of tie rods are in spaced planes and the rods in a group are not continuous along the machine. The tie rods are made of such lengths that they will have their abutting or adjoining ends in the various planes. For example, the upper tie rod 30A (FIG. 2) ends at leg 24C, the next tie rod 30B extending from leg 24C to leg 24E. The lower tie rod 31A extends to leg 24B and the next tie rod from leg 24B to leg 24D. The others are similarly arranged, there preferably being upper and lower sets on each side of the machine. By such an arrangement, it is possible rigidly to hold the parts in assembled and aligned relation and yet from the basic structure, to permit various combinations of lengths of tables or units and numbers of tables or units to be employed.

The alignment aspect of the assembly particularly relates to transverse alignment and vertical alignment. The tables 21 are fastened by bolts 32 (FIG. 10) to the upper flanges of the legs. If desired, the tables may rest on a rubber pad or resilient means 33 placed on top of a leg.

The work holding fixtures 44, as mentioned, can take various forms depending upon the part to be machined. Fixtures 44 are mounted on the carrier means indicated generally at 36 (FIGS. 8, 9). In FIG. 2, carriers 36 are shown schematically, the fixtures being omitted for clarity except at the first station. FIG. 1 illustrates machine tools only at 37 and 38, these being omitted for other stations and in FIG. 2. Various types of machine tools and combinations thereof can be mounted on the tables.

Each carrier 36 comprises a base 43B having side plates 39 and 40 (FIG. 9), said side plates 39 and 40 having laterally and inwardly extending clamping ledges 41 and 42, said ledges being fastened to the side plates, for example, by screws 43A. Carrier base plate 43B has a fixture 44 mounted thereon in predetermined position in the usual manner. Each of the stations has a pedestal 45 fastened to the table at its proper location, the pedestal having a flat track, conveyor rail or guide surface 46 and a V-shaped track conveyor rail or guide surface 47. The conveyor rails may extend slightly beyond the pedestal in each case, each being longitudinally spaced from the preceding and succeeding conveyor rails. It is preferred that the leading edges of the guide rails, such as at 48 (FIG. 6) of rail 47, be chamfered so that the carrier means will be guided thereon irrespective of slight longitudinal misalignment.

Each carrier means has a guide surface 49 complementary to the top of guide rail 46 and a notch 50 complementary to the top of the V-shaped guide rail 47. The V rail and notch could be reversed. In this manner, the transverse location of the carrier plate is accomplished positively by a single V-shaped guide rail as compared with two V-shaped guide rails which may cause difficulty in transverse alignment. The carrier means are made longer than the longitudinal space between adjacent rails so that the carrier means will straddle the rails of two pedestals or work stations as they are being transferred.

In order to move the carriers lengthwise of the machine, a transfer bar assembly operable by hydraulic or pneumatic cylinder 51 is provided, the pneumatic cylinder 51 being arranged to reciprocate transfer bar assembly 52 (FIG. 11). The transfer bar assembly is made up of sections or individual bars connectable by bolts 55, such being arranged so that any number of individual bars can be joined together in accordance with the particular arrangement of the machine to be used. The transfer bar assembly has pawl means 53 mounted adjacent each of the stations, said pawl means being engageable with pins 54 (FIGS. 9, 11) on the carrier means for advancing each of the carriers from the station at which it is located to the next station. Spring 53A and limit screw 53B permit a pawl 53 to pass over a pin 54 during return of the transfer bar. As the carrier is moved forward, it will engage the conveyor tracks of the next pedestal before it leaves the tracks of the pedestal from which it is being transferred in such a manner that the transfer will be properly effected.

Figure 6:
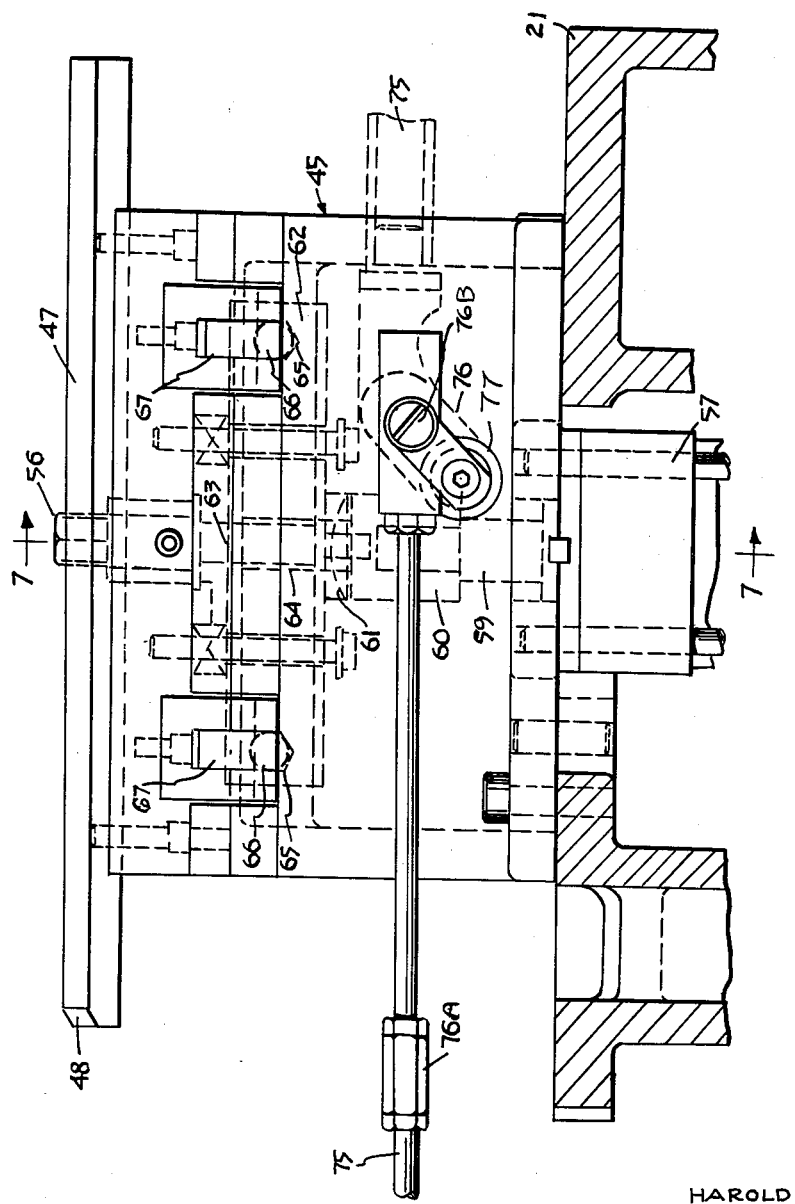
FIG. 6 is an enlarged view of a pedestal, taken in the direction 6—6 of FIG. 1.
Figure 7:
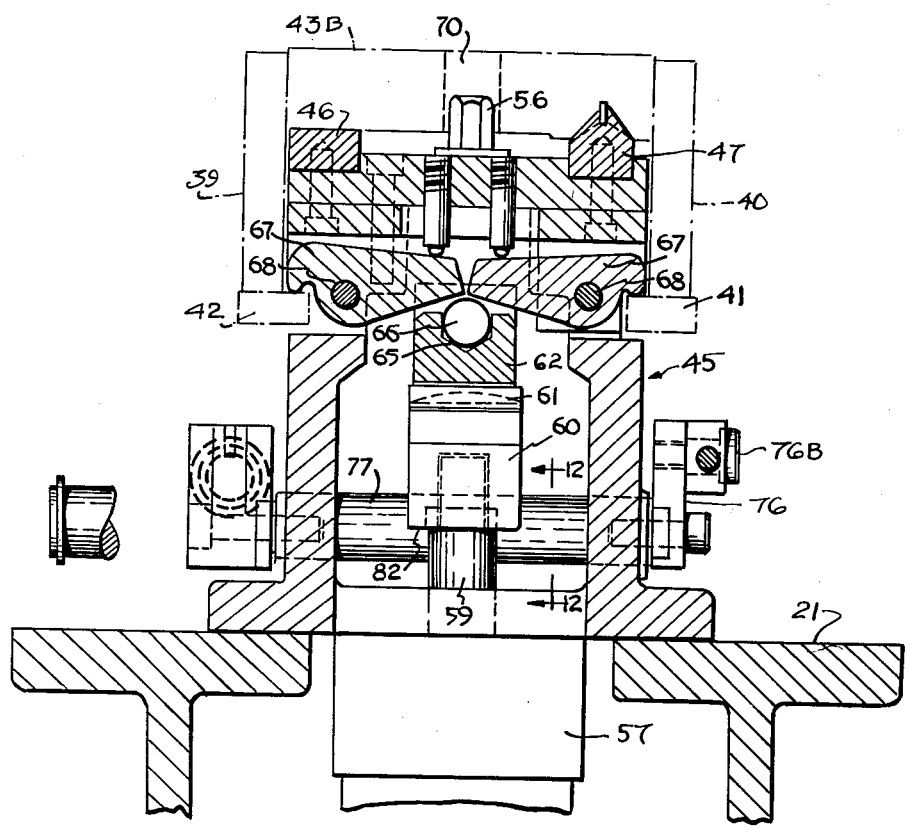
FIG. 7 is a view along the line 7—7 of FIG. 6.

Referring now to the carrier longitudinal locating and clamping means, pedestal 45 (FIGS. 6, 7) having conveyor guides thereon has a carrier locating pin or shot pin means 56, said locating pin means being reciprocable by pneumatic cylinder 57 (FIGS. 6, 9). Piston rod 59 has attached thereto a block 60, said block having mounted thereon spherical washer means 61 and clamping yoke 62. Locating pin 56 is screw-threadedly fastened to block 60, the shank 63 thereof passing through an aperture 64 in yoke 62 and through spherical washer 61. Yoke 62 has seats 65 adjacent the ends thereof for receiving balls or engaging elements 66. The balls 66 are engageable with clamping lever means 67 which are pivoted at 68 to the pedestal.

Describing the operation thereof, after a carrier 36 has been moved longitudinally by the transfer bar to the succeeding station or pedestal, a suitable circuit means (not shown) is energized to actuate and raise piston rod 59. Such first moves locating pin 56 upwardly into locating aperture 70 in the bottom of carrier plate 43B. This will accurately locate the carrier longitudinally of the work path. A bushing 1 may be used in the aperture so as to permit accurate fitting of the end of the locating pin 56 therein.

After the carrier 36 is longitudinally located along the work path, piston rod 59 in the same action continues its upward movement, yoke 62 raising balls 66 against each of the arms 67 so as to rock the outer legs of the arms onto the upper faces of clamping ledges 41, 42. Such will pull and clamp the carrier tightly against the conveyor guides or rails to position the carrier transversely and to hold the same during a machining operation on the work held thereby. The combination of ball 66 and spherical washer 61 provides a four point even clamping action so that the carrier will be tightly and correctly positioned on the guide surfaces 49, 50 and held longitudinally as located by locating pin 62.

In order to prevent operation of the various machine tools until the carrier has been correctly positioned and clamped, a mechanical feeler or sensing arrangement may be provided, such being employed in conjunction with conventional relay circuits (not shown) or signals to prevent operation of tools or transfer until the carrier is clamped or unclamped, respectively.

Sensing bar assembly 75 may be composed of a plurality of rods joined by adjustable couplings 76A. Arms 76 are pivotally connected at 76B to sensing bars 75, arms 76 also being connected to shaft 77. In FIG. 6, locating pin 56 is shown in its upper or locating position and the clamping means in clamped position, arm 76 and rod 75 being to the right. The shaft 77 has a cut-away portion 78 (FIG. 12) with a flat surface 79 at one corner thereof. When the arm 76 is moved counterclockwise (FIG. 6) by rod 75, and pin 56 is in retracted position, surface 79 can move until its contacts surface 80 of block 60. When in such a position, the circuitry or signal means responsive to movement of rod 75 can be arranged so that the transfer bars may be operated to transfer the carriers from one position to the next. After the locating pin and clamping means are activated, so that the locating pin 56 is in the position shown in FIG. 6, rotation of arm 76 clockwise will result in surface 81 of shaft 77 coming into engagement with the lower surface 82 of block 60, which will provide a mechanical indication through position of rod 75, that the locating pin is in its locating position and the carrier is properly clamped. The machine tools then can be operated to carry out the various operations at the work stations.

The elevator arrangement shown at the left in FIG. 2 and in more detail in FIG. 2a will take returned carriers from the return conveyor chain 95 and move them into position to be transferred to the first work station.

The return conveyor chain may be operated by motor 100, said chain being of the conventional roller chain type having rollers 101 upon which the clamping ledges 41, 42 rest. Guide surfaces 102 under the chain provide a lower surface upon which the rollers rotate as the chain is operated. As a carrier located on the the chain moves to the left, the rollers may be rotated by pressure against the guide surfaces 102 so that the carrier on top thereof will have the angular motion of the rollers imparted thereto in addition to the linear motion of the chain in relation to the guide surfaces 102.

Figure 5:
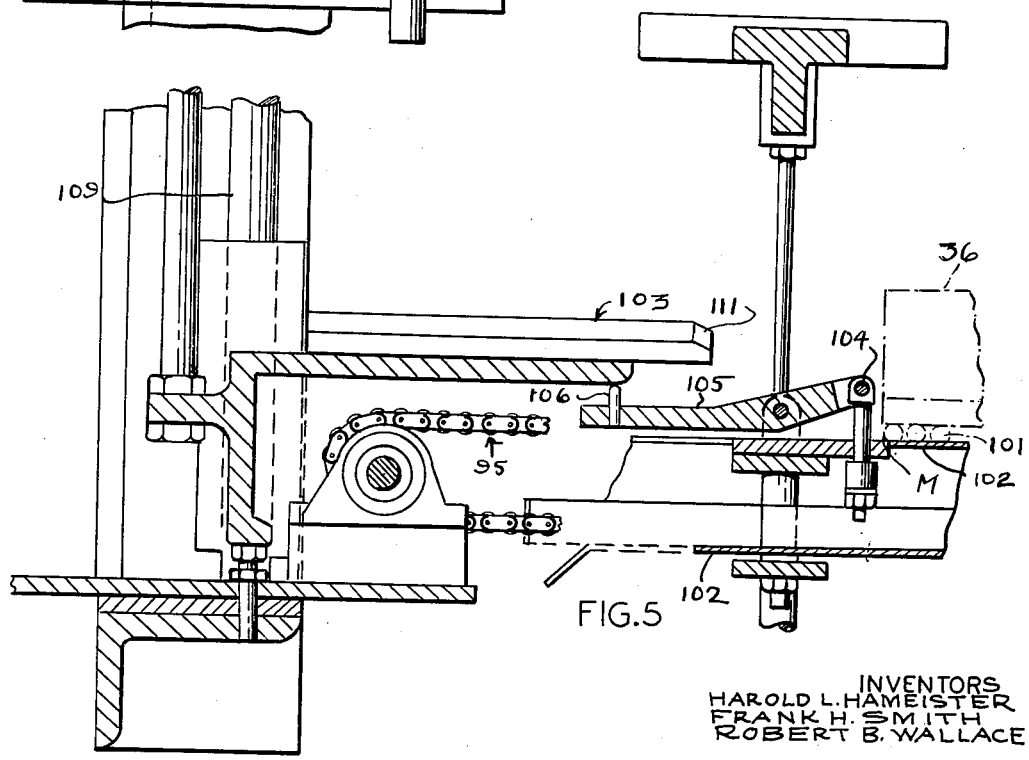
FIG. 5 is an elevation along the line 5—5 of FIG. 4.

When the elevator 103 (FIGS. 4, 5) is in lowered position and ready to receive a returned carrier, detent blocking pin 104 on pivoted lever 105 will have been raised to the position shown in FIG. 5 above the tops of clamping ledges 41, 42 to permit the carrier to move onto the elevator. Such is accomplished by contact of the lower surface of elevator 103 with pin 106 rotating lever 105 about pivot 107. When the elevator 103 is moved upwardly, blocking pin 104 will be lowered to prevent movement to the left of the next carrier until the elevator is again in a carrier receiving position. The elevator can be actuated by any suitable means such as pneumatic cylinder or motor means 108 through rods 109. Elevator plate 103 has a flat guide surface 110 and V-shaped guide surface 111 similar to those on the pedestals 45.

Figure 3:
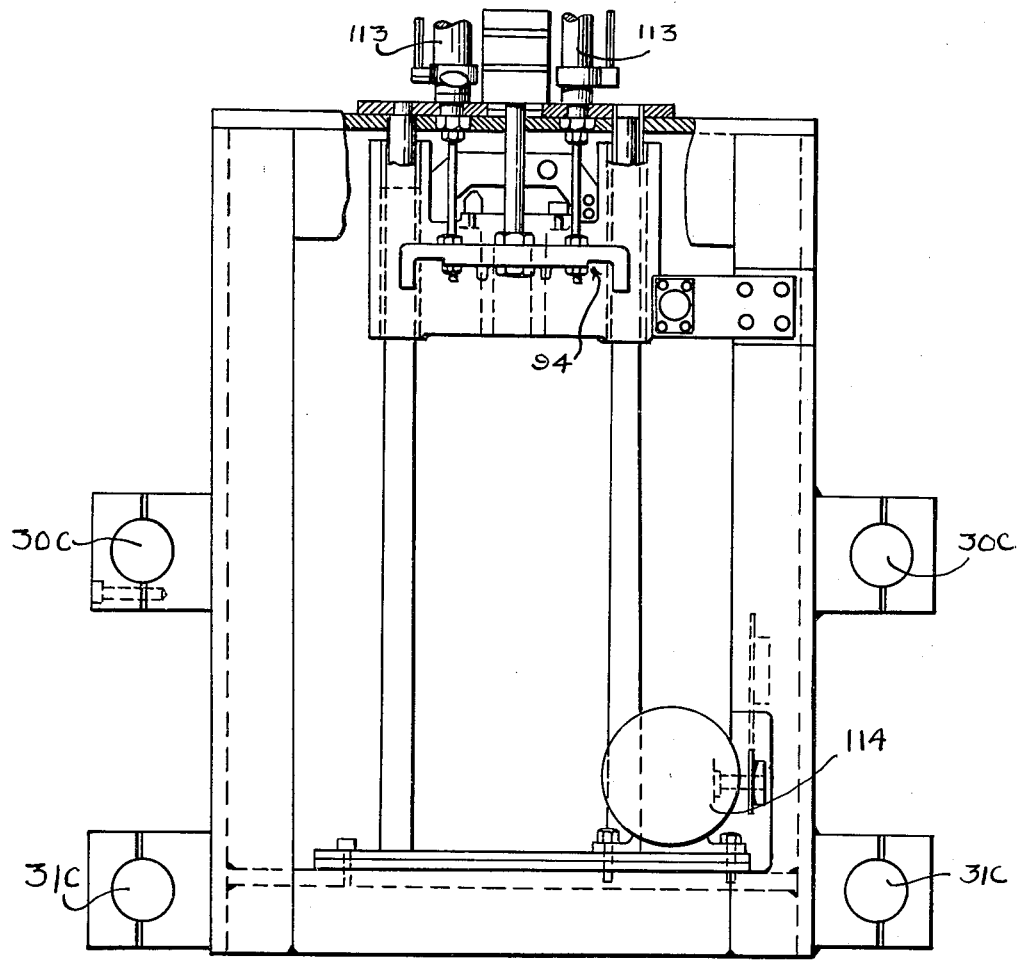
FIG. 3 is an enlarged fragmentary elevation along the line 3—3 of FIG. 2.

The lowering means on elevator 94 (FIGS. 2, 2b, 3) receives carriers from the work path and lowers them to the return path, a pneumatic cylinder or other suitable motor 112 operating rods 113 being provided.

A chip collector means, shown generally at 34 (FIGS. 1, 10), is arranged to receive chips and coolant from the tables, such being fed thereto through apertures at 35 at the bottom of the tables through a chute 36A to the chip carrier. The chip carrier may comprise an endless belt arrangement having various fingers thereon as is well known in the art. Motor 114 drives the chip conveyor.

The tools at the work stations, such as drills, can be fastened to a yoke 114A (FIG. 10) which is rigidly attached to table 21. The yoke itself may have the tool guide bushings therein rather than to have them a part of the fixtures.

The various operations can be controlled manually or can be actuated by conventional sequentially activated conventional circuits (not shown).

It should be apparent that details of construction can be varied without departing from the spirit of the invention except as defined in the appended claims.

What is claimed is:

1. In a multiple station machine having work piece carrier means movable from station-to-station, each of said carrier means having a flat guide surface and a V-shaped guide surface, the combination including a plurality of units assemblable into a straight-line machine, said units having machine tool work stations thereon, means joining said units to each other in assembled relationship, conveyor track means on said units providing a path for guiding said carrier means along said machine, said conveyor track means comprising a flat guide surface and a V-shaped guide surface for engagement with the similar surfaces on said carrier means, said V-shaped guide surface positioning said carrier means transversely of said track means, the adjacent ends of said track means being longitudinally spaced so that misalignment thereof will not affect movement of said carrier means therealong, and transfer means for moving said carrier means from station-to-station.

2. In a multiple station machine having work piece carrier means movable from station-to-station, each of said carrier means having a flat guide surface and a V-shaped guide surface, the combination including a plurality of units assemblable into a straight-line machine, said units having machine tool work stations thereon, means joining said units to each other in assembled relationship, and conveyor track means on said units providing a path for guiding said carrier means along said machine, said conveyor track means comprising a flat guide surface and a V-shaped surface for engagement with the similar surfaces on said carrier means, said V-shaped guide surface positioning said carrier means transversely of said track means, the adjacent ends of said track means being longitudinally spaced so that misalignment thereof will not affect movement of said carrier means therealong, the spacing between adjacent ends being less than the length of said carrier means.

3. In a multiple station machine having work piece carrier means movable from station-to-station, the combination including a plurality of units assemblable into a straight-line machine, each of said units including a table, said tables having machine tool work stations mountable thereon, support legs located between said tables, adjacent table margins being supported by one of said legs, a plurality of tie rod means connecting said legs and joining said units to each other in assembled relationship, one group of a plurality of tie rod means extending longitudinally between said legs in one plane, another group of a plurality of tie rod means extending longitudinally between said legs in another plane, the adjacent ends of the tie rod means in one group being at a different leg than the adjacent ends of the tie rod means in the other group, conveyor track means on said units providing a path for guiding said work piece carrier means along said machine, the adjacent ends of said track means being spaced so that misalignment will not affect transfer movement, and transfer means for moving said carrier means from station-to-station along said machine.

4. In a multiple station machine having work piece carrier means movable from station-to-station, the combination including a plurality of units locatable in a straight line relationship, said units having work stations thereon, means joining said units to each other in assembled relationship, conveyor track means on said units providing a path for guiding said work piece carrier means along said machine, carrier locating means at said work stations movable relative to a carrier means for positioning a work carrier means after transfer thereto, clamping means for holding the work carrier means in position at a station after it has been located by said carrier locating means, said clamping means being contactable with spaced portions of said carrier means, single means for operating said carrier locating means and said clamping means, said single means including means for uniformly exerting clamping force on said spaced portions of said carrier means, and transfer means for moving said carrier means from station-to-station when said locating means and clamping means are in an ineffective position.

5. In a multiple station machine having work piece carrier means movable from station-to-station, the combination including a plurality of units locatable in a straight line relationship, said units having work stations thereon, means joining said units to each other in assembled relationship, conveyor track means on said units providing a path for guiding said work piece carrier means along said machine, the adjacent ends of said track means being spaced so that misalignment will not prevent movement of said carrier means from station-to-station, carrier locating means at said work stations movable relative to a carrier means for positioning a work carrier after transfer thereto, said clamping means being contactable with spaced portions of said carrier means, clamping means for holding the work carrier in position at a station after it has been located at said station, single means for operating said carrier locating means and said clamping means, said single means including means for uniformly exerting clamping force on said spaced portions of said carrier means, and transfer means for moving said carrier means from station-to-station when said locating means and clamping means are in an ineffective position.

6. In a multiple station machine having work piece carrier means movable from station-to-station, said carrier means having a flat guide surface and a V-shaped guide surface, the combination including a plurality of units locatable in a straight line relationship, said units having work stations thereon, means joining said units to each other in assembled relationship, conveyor track means on said units providing a path for guiding said work piece carrier means along said machine, the adjacent ends of said track means being spaced so that misalignment will not prevent movement of said carrier means from station-to-station, carrier locating means at said work stations movable relative to a carrier means for positioning a work carrier means after transfer thereto, clamping means for holding the work carrier means in located position at a station, and transfer means for moving said carrier means from station-to-station when said locating means and clamping means are in an ineffective position, said conveyor track means comprising a flat guide surface and a V-shaped guide surface for engagement with the similar surfaces on said carrier means, said V-shaped guide surface positioning said carrier means transversely of said track means.

7. In a multiple station machine having work piece carrier means movable from station-to-station, said carrier means having a flat guide surface and a V-shaped guide surface, the combination including a plurality of units locatable in a straight line relationship, said units having work stations thereon, means joining said units to each other in assembled relationship, conveyor track means on said units providing a path for guiding said work piece carrier means along said machine, the adjacent ends of said track means being spaced so that misalignment will not prevent movement of said carrier means from station-to-station, carrier locating means at said work stations movable relative to a carrier means for positioning a work carrier means after transfer thereto, clamping means for holding the work carrier means in located position at a station, and reciprocable transfer bar means for moving said carrier means from station-to-station, said bar means having separable joints therein so that the length thereof can be selected in accordance with the number of units.

8. In a multiple station machine having work piece carrier means movable from station-to-station, the combination including a plurality of units, said units having work stations thereon, means joining said units to each other in assembled relationship, conveyor track means on said units providing a path for guiding said work piece carrier means along said machine, reciprocable locating pin means on said units for positioning carrier means along said path prior to clamping thereof, mechanical sensing means cooperable with said locating pin means, said sensing means being movable to work tool operative position only when all of said locating pin means are in carrier means positioning location, and transfer means for moving said carrier means from station-to-station.

9. In a multiple station machine having work piece carrier means movable from station-to-station, the combination including a plurality of units, said units having work stations thereon, means joining said units to each other in assembled relationship, conveyor track means on said units providing a path for guiding said work piece carrier means along said machine, reciprocable carrier means locating pin means and clamping means on said units for locating and positively holding a carrier means, a single operating means connected to said locating pin means and clamping means for actuating the same, reciprocable mechanical sensing means cooperating with said single operating means, said means being reciprocable to work tool actuating position and transfer means actuating position only when said locating pin means and clamping means are in active or inactive relationship, respectively, and transfer means for moving said carrier means from station-to-station.

10. In a multiple station machine having work piece carrier means movable from station-to-station, the combination including a plurality of units, said units having work stations thereon, means joining said units to each other in assembled relationship, conveyor track means on said units providing a work path for guiding said work piece carrier means along said machine past said work stations, return conveyor chain means located in a path spaced from said work path, said chain means having rollers upon which said carrier means rest, guide means upon which said rollers move so that as said chain means transports a carrier means thereon in a return path, said carrier means will travel faster than the linear speed of said chain means, transfer means for moving said carrier means along said work path from station-to-station, elevator means at each end of said machine for moving said carrier means between said work path and return path, and detent means controlling movement of carrier means from said return path to one of said elevators carrying it to said work path.

11. In a multiple station machine having work piece carrier means movable from station-to-station, the combination including a plurality of units assemblable into a straight-line machine, said units having machine tool work stations thereon, means joining said units to each other in assembled relationship, conveyor track means on said units providing a work path for guiding said carrier means along said machine, the adjacent ends of said track means being longitudinally spaced along said work path so that misalignment will not affect movement of said carrier means therealong, transfer means for moving said carrier means from station-to-station, return conveyor means having a return path for said conveyor means, and elevator means at each end of said machine for moving said carrier means between said work path and said return path.

12. In a multiple station machine having work piece carrier means movable from station-to-station, the combination including a plurality of units locatable in a straight line relationship, said units having work station pedestals thereon, means joining said units to each other in assembled relationship, conveyor track means on said pedestals providing a path for guiding said work piece carrier means along said machine, carrier locating pin means at said work station pedestals reciprocably movable relative to a carrier means for positioning a work carrier after transfer thereto, clamping means for holding a work carrier means in located position after it has been located at a station, an operator for said clamping means, said clamping means including a yoke movably connected to said operator, pivoted clamping arms engageable with a carrier means, and ball means for transferring movement of said yoke to said clamping means so that said clamping arms will uniformly engage said carrier means and hold said carrier means on said track means, and transfer means for moving said carrier means from station-to-station when said locating means and clamping means are in an ineffective position.

13. In a multiple station machine having work piece carrier means movable from station-to-station, the combination including work station pedestals, carrier locating reciprocable pin means at said work station pedestals, movable relative to a carrier means for positioning a work carrier means after transfer thereto, clamping means for holding a work carrier means in located position, and a single operator for said locating pin means and clamping means, said clamping means including a yoke movably connected to said operator, pivoted clamping arms engageable with a carrier means, and ball means for transferring movement of said yoke to said clamping arms so that said clamping arms will uniformly engage said carrier means and hold said carrier means on said track means.

14. In a multiple station machine having work piece carrier means movable from station to station, the combination including a plurality of units assembled in end-to-end relationship to form a straight-line machine, each of said units including table means, each table means being adapted to have at least one machine tool work station mounted thereon, a plurality of support means so positioned as to provide one support means at each outer end portion of the terminal table means and a single support means for each two intermediate adjacent table margins, elongated means connecting said support means and joining said units to each other in assembled rigid relationship, conveyor track means on said units providing a path for guiding said work piece carrier means along said machine, and transfer means for moving said carrier means from station to station along said machine.

15. The combination as recited in claim 14 in which said support means extend transversely to the longitudinal axis of said straight-line machine.

16. The combination recited in claim 14 wherein said elongated connecting means comprises upper and lower rows of tie rods running parallel to each other and extending longitudinally on each side of said machine, each row consisting of a plurality of tie rods, the ends of which are connected to predetermined support means, the ends of said tie rods of said upper row being connected to different support means than the support means to which the ends of said tie rods of said lower row are connected.

References Cited in the file of this patent

UNITED STATES PATENTS

| | | |
|---|---|---|
| 2,193,840 | Oberhoffken | Mar. 19, 1940 |
| 2,392,169 | Mansfield | Jan. 1, 1946 |
| 2,745,167 | Cross | May 15, 1956 |
| 2,829,762 | Oswald | Apr. 8, 1958 |
| 2,903,120 | Thomas | Sept. 8, 1959 |